Figure 1:
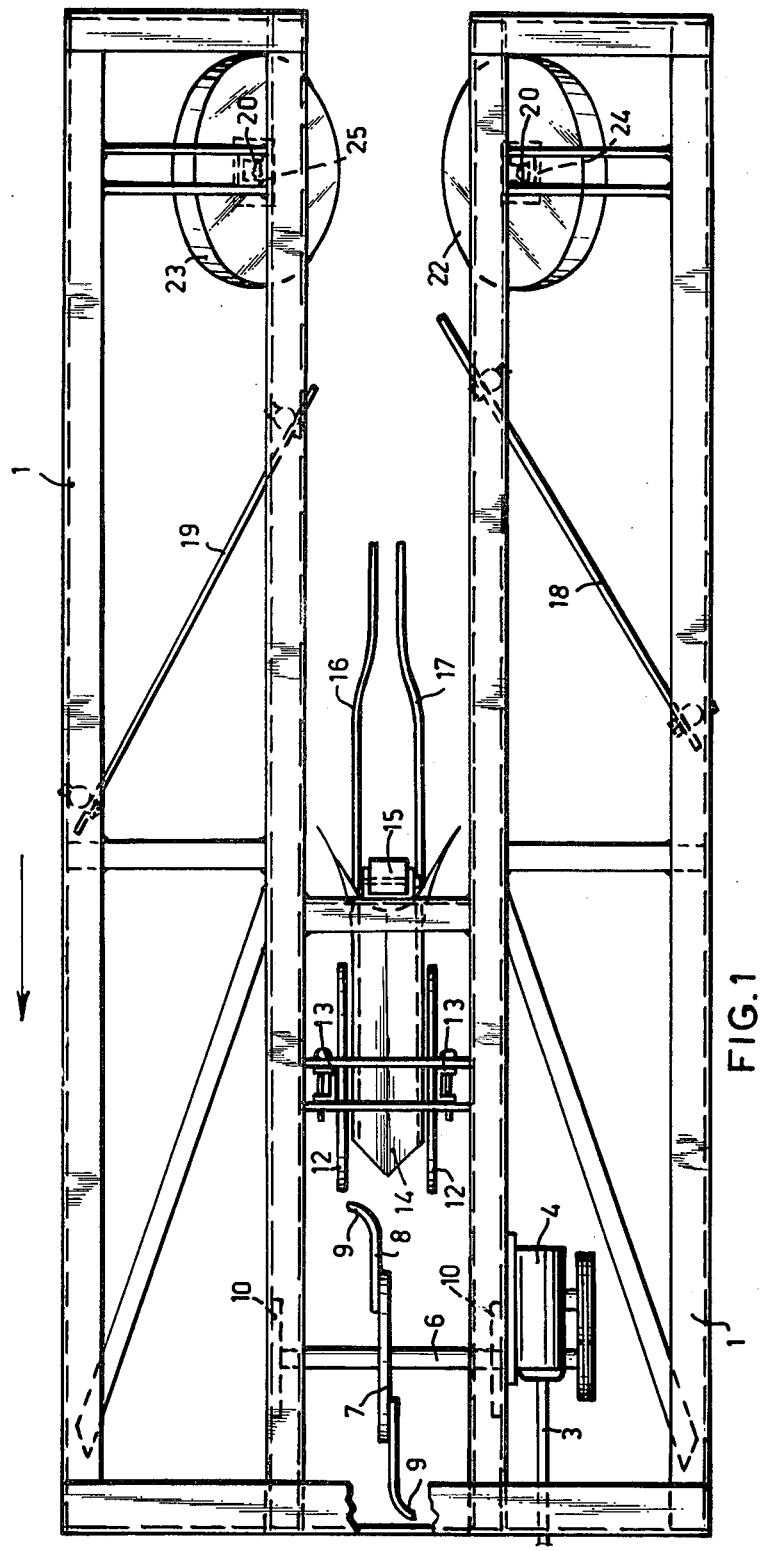

United States Patent [19]

Vink

[11] 4,026,225
[45] May 31, 1977

[54] MACHINE FOR PLANTING TREES, SHRUBS AND THE LIKE

[76] Inventor: Theodoor Johannes Vink, Ridderslag 9, Beesd, Netherlands

[22] Filed: Jan. 22, 1976

[21] Appl. No.: 651,486

[30] Foreign Application Priority Data

Jan. 22, 1975 Netherlands ............... 7500748

[52] U.S. Cl. ................................. 111/2; 111/3; 111/85; 172/72; 172/146
[51] Int. Cl.² ................. A01C 11/02; A01B 49/02
[58] Field of Search ..................... 111/2–4, 111/85; 172/63, 68, 71, 72, 146

[56] References Cited

UNITED STATES PATENTS

| 1,972,281 | 9/1934 | Walling ........................... 111/3 X |
| 3,643,611 | 2/1972 | Owens et al. ....................... 111/2 |

FOREIGN PATENTS OR APPLICATIONS

| 287,081 | 6/1914 | Germany ........................... 172/72 |
| 1,120,199 | 12/1961 | Germany ........................... 111/3 |
| 815,715 | 7/1949 | Germany ........................... 111/2 |
| 1,391,519 | 4/1975 | United Kingdom ............... 111/3 |
| 213,078 | 3/1924 | United Kingdom ............ 172/146 |

OTHER PUBLICATIONS

University of Wisconsin, Tree Planter, 111/3, 6–52, 9 Pictures, 6 Numbered No. 26967–C, No. 26968–C, No. 26969–C, No. 26970–C, No. 27,543–C, No. 27544–C, Pictures taken in 1943 and 1944.

*Primary Examiner*—Edgar S. Burr
*Assistant Examiner*—Steven A. Bratlie
*Attorney, Agent, or Firm*—Sughrue, Rothwell, Mion, Zinn and Macpeak

[57] ABSTRACT

A horizontal frame coupled to a tractor is provided with a single disc mounted for rotation about a horizontal axis on the center line of the frame and driven by the power take off shaft of a tractor with the disc carrying a plurality of cutter teeth which are curved radially and whose outboard ends are bent alternately in the opposite axial direction for loosening the soil in front of a pair of discs mounted on either side of a coulter. A pair of soil guide plates are positioned on each side of the trench being dug and behind the coulter, converging plates mounted to the frame and extending vertically above the plane of the coulter and the soil guide plates and converging behind the guide plates, fill in the trench while rollers mounted for rotation about their axis on either side of the center line of the coulter and to the rear of the converging plates press the soil of the filled in trench in the direction of the trench center line.

1 Claim, 2 Drawing Figures

MACHINE FOR PLANTING TREES, SHRUBS AND THE LIKE

The invention relates to a machine for planting trees, shrubs and the like, comprising a frame provided with a mechanism for coupling to a tractor and partially supported by said tractor, and with a mechanism for coupling the power take off shaft of the tractor to one or more tools that are used for planting, said tools consisting among others of a drivable cutter means rotatable about a horizontal axis for first loosening the soil to be planted.

The object of the invention is to provide the machine also with tools for mechanically planting trees and the like. For that purpose the machine according to the invention is furthermore provided with one single disc rotatable on the center line of the machine and with two discs rotatable about horizontal axes, said discs being mounted on either side of the center line and as seen in the direction of movement of the machine, being located behind the cutter means for loosening the soil of the trench to be planted, and with a two-sided trench coulter movable along the center line of the machine, with soil guiding plates positioned on either side of the trench to be dug and behind the coulter, between which when the machine is advancing the trees or shrubs to be planted can be placed, and with plate-like means placed convergently behind the guide plates for filling in the trench, in which the trees or shrubs have been planted, and with rollers rotatable about their axes as hindmost tools on either side of the centerline of the coulter, said rollers being in such an oblique position that they can press the soil of the trench filled-in in the direction of the centerline.

In an embodiment of the machine according to the invention all the tools can be adjusted separately in the direction of height.

In the drawing an embodiment of the machine according to the invention is represented by way of example.

Figure 2:
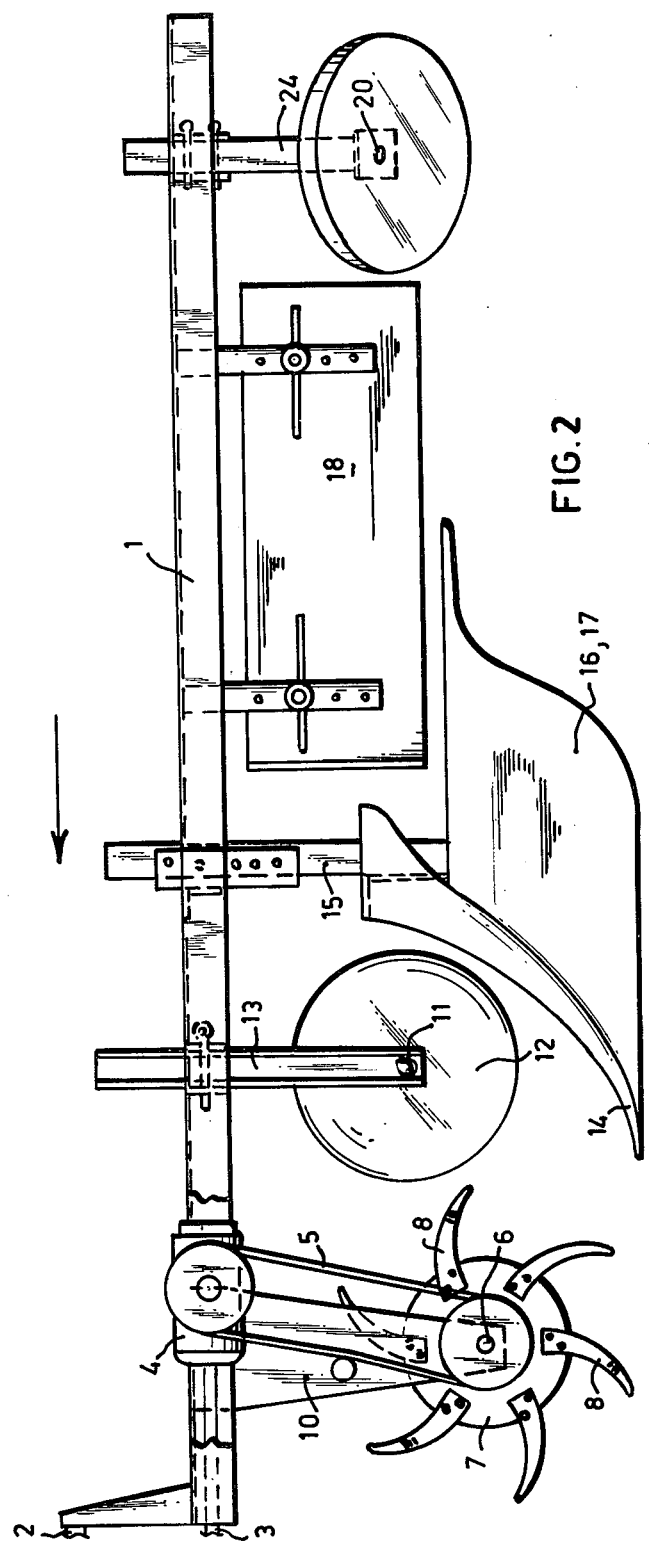

FIG. 1 gives a schematic top view of the machine.
FIG. 2 gives a schematic side view of the machine.

The machine comprising a frame 1 positioned in a horizontal plane and being of U-shape with the open side thereof directed rearwardly. The front side of the frame 1 is provided with a connection 2 for coupling and partially supporting the frame to the back of a tractor (not shown). The power take off shaft of the tractor (not shown) can be connected to a shaft 3 to be driven thereby and extending in the longitudinal direction of the frame and supported in it, which shaft 3 drives a cutter means 7 for rotation about the axis of a horizontal shaft 6 to which the cutter means is fixed through a gear box 4 with a right angle transmission and a chain transmission 5. This cutter means is provided with teeth 8 curved in radial direction and provided with bent ends 9 extending axially to each side with which the soil of a trench to be dug can be loosened. The cutter means 7 can be adjusted in the direction of height by slewing of its supporting arms 10.

Two discs 12 rotatable about horizontal shafts 11 are mounted behind the cutter means 7 on either side of its centerline. The shafts 11 are fastened in supporting arms 13 which are fastened to the frame 1 in a manner to make them adjustable in height. The discs 12 serve for loosening the soil of the trench to be dug. Behind and within the zone between the discs 12 there is a two-sided trench coulter 14 for digging the trench. This coulter 14 is fastened to an arm 15 which is fastened to the frame 1 for adjustment in height. Behind the coulter 14 there are present vertically mounted parallel guide plates 16, 17 also fastened to the arm 15, between which e.g. by a planter present on the frame 1 the trees or shrubs (not shown) and the like can be planted in the dug trench.

Behind these guide plates 16 convergent vertical soil displacing means or plates 18, 19 are fastened to the frame 1 at an angle with respect to the centerline of the coulter 14 and the guide plates 16, 17. They are in an oblique position with respect to the centerline of the coulter 14 and that of the dug trench in such a way that the soil pushed aside by the coulter 14 can be pushed back into the dug trench and about the plated trees or shrubs. Two rollers 22 and 23 rotatable about shafts 20 serve for pressing the soil pushed back into the trench. The rollers 22 and 23 are in such an oblique position that the soil pushed back into the trench is pressed in the direction of the centerline of the trench by their circumferential surfaces onto the roots of the trees or shrubs.

The middle of the frame 1 is open, rearwardly in order that the planted trees or shrubs can readily be moved outside the frame 1 when the machine is advanced.

The rollers 22, 23 also serve for carrying the frame 1 and can be adjusted in direction of height by their supporting arms 24 and 25.

What is claimed is:
1. In a machine for planting trees and the like, comprising a frame provided with a mechanism for coupling the frame to a tractor and for partial support by the tractor with the frame extending horizontally and to the rear of the tractor, a mechanism for coupling the power take-off shaft of the tractor to at least one tool carried by the frame, and drivable cutter means comprising said at least one tool and rotatable about a horizontal shaft for loosening the soil and coupled to said mechanism, and a coulter mounted to the frame and depending from that frame at the center line of the frame for forming a trench, the improvement wherein:
said cutting means comprises a single disc mounted for rotation about its axis and vertically disposed at the forward end of said frame and having a plurality of teeth mounted to its periphery, said teeth being curved radially and terminating in ends which are bent alternately in opposite axial directions away from said disc,
paired discs mounted about horizontal shafts on either side of the coulter and positioned to the rear of said single disc for loosening of the soil,
soil guide plates positioned on either side of the trench being dug and behind the coulter and between which, when the machine is advancing, the trees or shrubs to be planted may be placed,
vertical plate-like means mounted to said frame above the plane of said coulter and said soil guide plates and converging rearwardly behind the guide plates for filling in the trench in which the trees or shrubs have been planted, and
rollers mounted for rotation about their axes as hindmost tools on either side of the center line of the coulter and to the rear of said converging vertical plate-like means, said rollers being obliquely positioned such that their peripheries press the soil of the filled-in trench in the direction of the trench center line.

* * * * *